(12) United States Patent
Taki et al.

(10) Patent No.: US 6,176,812 B1
(45) Date of Patent: Jan. 23, 2001

(54) SPEED CHANGE TRANSITION CONTROL APPARATUS FOR AN AUTOMATIC TRANSMISSION

(75) Inventors: Masaharu Taki, Shimizu; Naonori Iizuka, Shizuoka-ken, both of (JP)

(73) Assignee: Jatco Corporation, Fuji (JP)

( * ) Notice: Under 35 U.S.C. 154(b), the term of this patent shall be extended for 0 days.

(21) Appl. No.: 09/088,093

(22) Filed: Jun. 1, 1998

(30) Foreign Application Priority Data

Jun. 16, 1997 (JP) .................................................... 9-158163
Jul. 25, 1997 (JP) .................................................... 9-200658

(51) Int. Cl.$^7$ .................................................... F16H 61/06
(52) U.S. Cl. .......................... 477/159; 477/154; 477/158
(58) Field of Search .................... 74/335, 336 R; 477/143, 154, 156, 158, 159; 475/116, 118, 120, 128; 701/60, 66, 58

(56) References Cited

U.S. PATENT DOCUMENTS

| | | | | |
|---|---|---|---|---|
| 5,292,288 | * | 3/1994 | Kashiwabara et al. | 475/63 |
| 5,669,849 | * | 9/1997 | Tabata et al. | 477/109 X |
| 5,674,151 | * | 10/1997 | De Schepper et al. | 477/154 X |
| 5,762,581 | * | 6/1998 | Kozaki et al. | 477/109 X |
| 5,782,711 | * | 7/1998 | Tsutsui et al. | 477/143 X |
| 5,826,208 | * | 10/1998 | Kuroiwa et al. | 701/54 |

FOREIGN PATENT DOCUMENTS

| | | |
|---|---|---|
| 1-199050 | 8/1989 | (JP) . |
| 2-3768 | 1/1990 | (JP) . |
| 2-89861 | 3/1990 | (JP) . |
| 3-113162 | 5/1991 | (JP) . |

* cited by examiner

Primary Examiner—Charles A. Marmor
Assistant Examiner—Ha Ho
(74) Attorney, Agent, or Firm—Blank Rome Comisky & McCauley (57) ABSTRACT

Disclosed herein is a speed change transition control apparatus for an automatic transmission. The speed change transition control apparatus comprises rotational speed detection unit for detecting an input shaft rotation speed of the speed change mechanism, and a feedback control unit for controlling engagement pressure through a fluid pressure control element in such a manner that the input shaft rotation speed during a speed change follows a target rotation slope with an actual input shaft rotation speed detected at an actual inertia phase start point by the rotational speed detection unit as its starting point.

10 Claims, 9 Drawing Sheets

SPEED CHANGE TRANSITION CONTROL APPARATUS FOR AN AUTOMATIC TRANSMISSION

FIELD OF THE INVENTION

The present invention relates to a speed change transition control apparatus for an automatic transmission, and more particularly to a speed change transition control apparatus for an automatic transmission that controls fluid pressure which is supplied to the friction engaging element of the speed change mechanism in the automatic transmission during speed changes.

DESCRIPTION OF THE RELATED ART

Generally, in commonly used automatic transmissions for vehicles, the rotational speed of the engine is input via the torque converter. The input rotational speed is changed by a speed change mechanism consisting of a plurality of planetary gear units and is output to the propeller shaft (axle shaft side).

The speed change mechanism in this kind of automatic transmission is usually equipped with a plurality of oil pressure actuated friction engaging elements such as clutches and brakes in order to transmit to a specific gear or carrier constituting the planetary gear unit the rotation of the input shaft transmitted from the torque converter and transmit the rotation of a specific gear or carrier to the output shaft suitably in correspondence to the position of the shift lever, or in order to restrict the rotation of a specific gear or carrier suitably.

If the solenoid valve incorporated in the oil pressure control circuit is controlled, the aforementioned friction engaging elements will be locked or released, and speed changes will be made. In this case, when the friction engaging elements are switched from a released state to a locked state or from a locked state to a released state, if a change in the locking force is not appropriately made, there will be a problem that an excessive torque shock will occur.

For example, when shifting up, the load of the friction engaging element on the release side is reduced to zero and the first stage (so-called torque phase) of a speed change ends, and at the second stage (so-called inertia phase) after the time that an execution gear ratio begins to change, there is a need to increase the locking capacity (i.e., supplied oil pressure) of the friction engaging element on the locking side appropriately at a rate of increase corresponding to the opening angle of the throttle valve to change the rotational speed of the input shaft of the speed change mechanism at an appropriate rate of change.

The reason is that if the above-mentioned locking capacity is too large, the rotational speed of the aforementioned input shaft will reduce rapidly and the speed change time required to shift up will be short, but the torque of the output shaft will increase temporarily and a great shock during a speed change will occur. On the other hand, if the above-mentioned locking capacity is too small, the speed change time will be excessive, resulting in a feeling in speed changes where disengagement between teeth is poor.

Hence, various kinds of techniques which attempt to change the rotational speed of the input shaft of the speed change mechanism more ideally by controlling oil pressure which is supplied to the above-mentioned friction engaging element during speed changes have been proposed.

For instance, in the control technique disclosed in Japanese Laid-Open Patent Publication No. HEI 1-199050, in the inertia phase during a speed change, on the basis of the quantity of change between the rotational speeds of the aforementioned input shaft before and after a speed change and the speed change time previously set in correspondence to the opening angle of the throttle valve, the target rotational speed change rate in the rotational speed of the aforementioned input shaft is calculated. From the calculated target rotational speed change rate, the target rotational speed of the aforementioned input shaft is calculated for each control cycle. With this target rotational speed as a control target value and also with the detected value of the rotational speed of the aforementioned input shaft as a feedback value, the feedback control for the aforementioned supplied oil pressure is performed in real time.

Figure 2A:
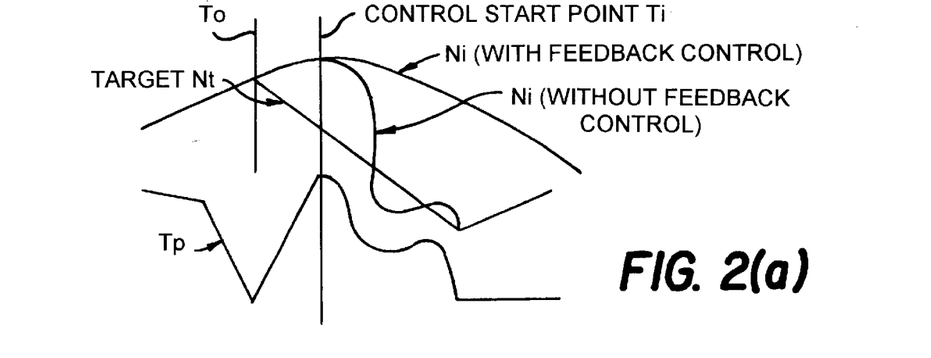
FIG. 2(a) is a diagram showing the operation of a conventional speed change transition control apparatus.

However, in the control technique disclosed in the above-mentioned publication, as shown for example in FIG. 2(a), between a predetermined target rotational speed Nt set at ideal timing and an ideal rate of change against the time axis (horizontal direction in the figure) and an actual rotational speed Ni of the input shaft, a large deviation occurs particularly at a control start point and immediately after the control start point. For this reason, a quantity of control in the feedback control becomes great immediately after the control start point, and a great hunting phenomenon is caused. As shown in FIG. 2(a), since the actual rotational speed Ni and output shaft torque Tp fluctuate considerably, there is a problem that a speed change shock is increased.

On the other hand, there is another conventional control method which changes the rotational speed of the input shaft of the speed change mechanism at a constant rate of change by feeding back oil pressure which is supplied during speed changes.

However, the above-mentioned conventional control method has the following disadvantage, because in the case of an identical speed change, the target change rate in the rotational speed of the input shaft is always constant.

Figure 11:
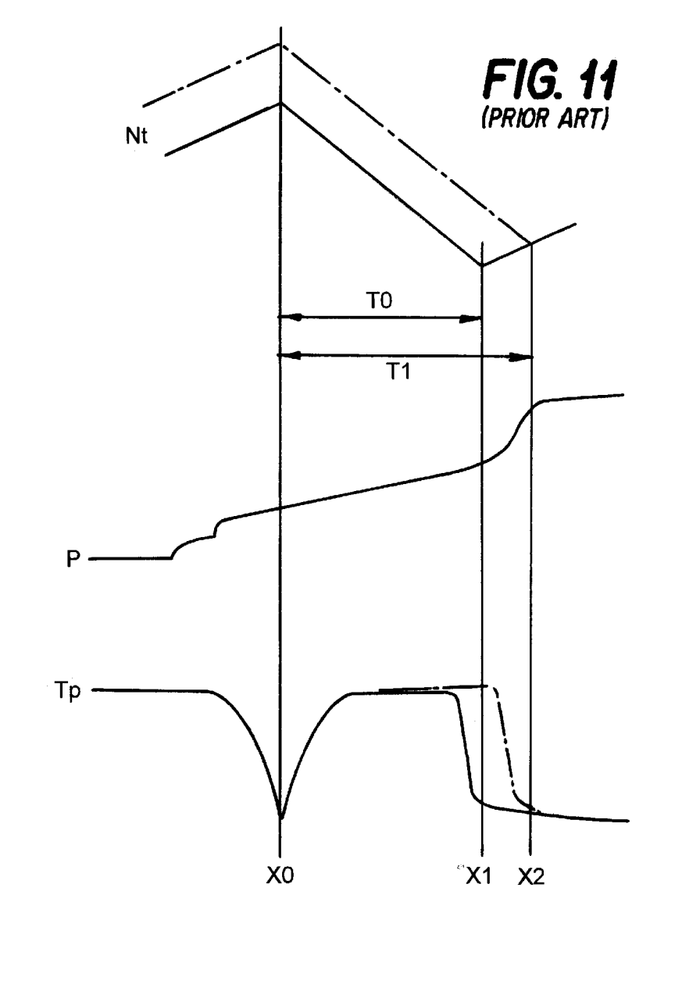
FIG. 11 is a diagram for describing conventional problems.

That is, as shown by a solid line in FIG. 11, if an actual rotational speed Nt of the input shaft at inertia phase start point $X_0$ matches with the target change characteristic of a previously set input shaft rotation speed Nt, the input shaft rotation speed Nt during a speed change, together with oil pressure P and output shaft torque Tp, will change nearly as set, and the speed change time will be nearly equal to a previously set time T.

However, actually the actual input shaft rotation speed Nt at inertia phase start point $X_0$ changes by major factors such as a fluctuation in vehicle speed and a fluctuation in an input torque. For instance, as shown by a dotted line in FIG. 11, there are cases where the input shaft rotation speed Nt exceeds a set value. Conventionally, even in such a case, since a feedback control for oil pressure P is performed while a target change rate remains constant, the speed change end point changes from $X_1$ to $X_2$, as shown in FIG. 11. Also, the actual speed change time T1 considerably exceeds a set speed change time $T_0$, and the output shaft torque Tp during a speed change increases by the amount of inertia force absorption, as shown by the dotted line. For this reason, the time during which the friction engaging elements of the speed change mechanism are slipping while transmitting a torque becomes extended by that amount, and the increased time constitutes an obstacle to an enhancement in the durability of the transmission. Furthermore, since the output shaft torque Tp increases in a time-axis direction, as shown by a dotted line in FIG. 11, there is another problem that a feeling in speed changes becomes poor.

SUMMARY OF THE INVENTION

It is an object of the prevent invention to provide a speed change transition control apparatus for an automatic transmission where an increase in the above-mentioned speed change shock is suppressed to obtain a satisfactory feeling in speed changes.

Another object of the present invention is to provide a speed change transition control apparatus for an automatic transmission where, even in the case of the high rotational speed of the transmission during a speed change, the speed change is ended within a predetermined time and therefore enhancements in durability and a feeling in speed changes are achieved.

To achieve the foregoing objects and in accordance with one important aspect of the present invention, there is provided a speed change transition control apparatus for an automatic transmission which has a speed change mechanism for performing speed changes by locking or releasing a plurality of friction engaging elements and also which is equipped with a fluid pressure control element for controlling engagement pressure which is supplied to the plurality of friction engaging elements, the speed change transition control apparatus comprising:

rotational speed detection means for detecting an input shaft rotation speed of the speed change mechanism; and feedback control means for controlling the engagement pressure through the fluid pressure control element in such a manner that the input shaft rotation speed during a speed change follows a target rotation slope with an actual input shaft rotation speed detected at an actual inertia phase start point by the rotational speed detection means as its starting point.

Figure 2B:
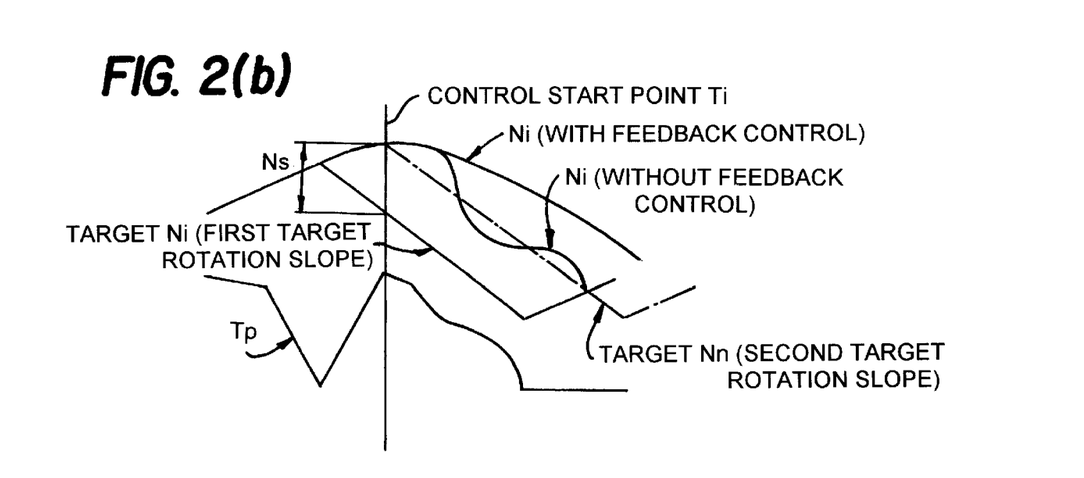
FIG. 2(b) is a diagram showing the operation of the speed change transition control apparatus according to the present invention.

With this constitution, the engagement pressure is controlled through the fluid pressure control element in such a manner that the input shaft rotation speed during a speed change follows a target rotation slope (second target rotation slope) with an actual input shaft rotation speed detected at an actual inertia phase start point as its starting point. For this reason, in the case of shift-up for example, as shown in FIG. 2(b), the actual rotational speed is reduced smoothly with a less quantity of fluctuation, and a fluctuation in the output shaft torque is also suppressed. Therefore, according to the above-mentioned constitution, a speed change shock can be made less uncomfortable, whereby an enhancement in a feeling in speed changes can be achieved.

In accordance with another important aspect of the present invention, there is provided a speed change transition control apparatus for an automatic transmission which has a speed change mechanism for performing speed changes by locking or releasing a plurality of friction engaging elements and also which is equipped with a fluid pressure control element for controlling engagement pressure which is supplied to the plurality of friction engaging elements, the speed change transition control apparatus comprising:

rotational speed detection means for detecting an input shaft rotation speed of the speed change mechanism;

arithmetic means for computing a difference between an input shaft rotation speed at an actual inertia phase start point on a first target rotation slope with an input shaft rotation speed at a previously set inertia phase start point as the starting point and an actual input shaft rotation speed detected at an actual inertia phase start point by the rotational speed detection means;

target rotation slope correction means for setting a second target rotation slope having the actual input shaft rotation speed as its starting point by moving the first target rotation slope in a parallel direction in correspondence to the input shaft rotation speed difference computed by the arithmetic means; and feedback control means for controlling the engagement pressure through the fluid pressure control element in such a manner that the input shaft rotation speed during a speed change follows the second target rotation slope set by the target rotation slope correction means.

With this constitution, the engagement pressure is controlled through the fluid pressure control element so that the input shaft rotation speed during a speed change follows a target rotation slope (second target rotation slope) with an actual input shaft rotation speed detected at an actual inertia phase start point as its starting point. For this reason, in the case of shift-up for example, as shown in FIG. 2(b), the actual rotational speed is reduced smoothly with a less quantity of fluctuation, and a fluctuation in the output shaft torque is also suppressed. Therefore, a speed change shock can be made less uncomfortable, and an enhancement in a feeling in speed changes can be achieved.

In accordance with still another important aspect of the present invention, there is provided a speed change transition control apparatus for an automatic transmission which has a speed change mechanism for performing speed changes by locking or releasing a plurality of friction engaging elements and also which is equipped with a fluid pressure control element for controlling engagement pressure which is supplied to the plurality of friction engaging elements, the speed change transition control apparatus comprising:

rotational speed detection means for detecting an input shaft rotation speed of the speed change mechanism;

target rotational speed setting means for setting a first target value of the input shaft rotation speed for each control cycle during a speed change on the basis of a quantity of change between the input rotational speeds before and after the speed change and a previously set speed change timing;

target rotational speed correction means for computing a difference between the first target value set by the target rotational speed setting means and the actual rotational speed detected by the rotational speed detection means and then setting a second target value of the input shaft rotation speed by adding a value corresponding to the difference to the first target value, for each control cycle during a speed change; and feedback control means for controlling the engagement pressure through the fluid pressure control element in such a manner that the input shaft rotation speed during a speed change follows the second target rotation slope set by the target rotation slope correction means.

With this constitution the first target value (ideal rotational speed) of the input shaft rotation speed for each control cycle during a speed change is set on the basis of a quantity of change between the input rotational speeds before and after the speed change and a previously set speed change timing. In each control cycle including the control start point, the difference between a target rotational speed (first target value) and an actual rotational speed is computed. In correspondence to this rotational speed difference, a second target value is set by adding a value corresponding to this difference to the aforementioned first target value. With the second rotational speed as a control target, a feedback control for the aforementioned line pressure is performed. For this reason, the control quantity proportional to a deviation is not excessively increased with reliability after the start of the control as well as at the start of the control. Also, actual rotational speed is reduced smoothly with less fluctuation than conventional, and consequently, a fluctuation in the output torque is considerably reduced. Therefore, a speed change shock developed in the inertia phase during speed changes can be made less uncomfortable, whereby a great enhancement in a feeling in speed changes can be achieved.

In accordance with a further important aspect of the present invention, there is provided a speed change transition control apparatus for an automatic transmission which has a speed change mechanism for performing speed changes by locking or releasing a plurality of friction engaging elements and also which is equipped with a fluid pressure control element for controlling engagement pressure which is supplied to the plurality of friction engaging elements, the speed change transition control apparatus comprising:

rotational speed detection means for detecting an actual rotational speed of the automatic transmission;

target change rate setting means for setting a target change rate in an input shaft rotation speed of the speed change mechanism on the basis of the actual rotational speed detected during a speed change by the rotational speed detection means so that the speed change is ended within a previously set speed change time; and feedback control means for controlling the engagement pressure through the fluid pressure control element in such a manner that the input shaft rotation speed during the speed change changes at the target change rate set by target change rate setting means.

The target change rate setting means may set an absolute value of the target change rate to a greater value, if the actual rotational speed is high. The rotational speed detected by the rotational speed detection means may be a rotational speed of an input shaft of the speed change mechanism. Also, the rotational speed detected by the rotational speed detection means may be a rotational speed of an output shaft of the speed change mechanism. Furthermore, the rotational speed detected by the rotational speed detection means may be a rotational speed of an input shaft of the automatic transmission.

With this constitution, the target change rate setting means sets a target change rate in an input shaft rotation speed of the speed change mechanism on the basis of an actual rotational speed detected during a speed change by the rotational speed detection means so that the speed change is ended within a previously set speed change time. And the feedback control means controls the engagement pressure through the fluid pressure control element in such a manner that the input shaft rotation speed during the speed change changes at the target change rate set by target change rate setting means.

The setting of the aforementioned target change rate is performed as follows. For example, if the actual rotational speed of the transmission is high, the absolute value of the aforementioned target change rate will be set to a greater value. Also, as the rotational speed of the transmission, the rotational speed of the input or output shaft of the speed change mechanism, or the rotational speed of the input or output shaft of the transmission (i.e., engine rotation speed), is detected.

For this reason, for example in the case where the above-mentioned rotational speed during a speed change fluctuates in an increasing direction, the absolute value of the target change rate in the feedback control is set and changed in an increasing direction in correspondence to the degree of fluctuation. Since the rotational speed changes at a sharper slope, a speed change ends within a predetermined speed change time. At this time, the output shaft torque is increased slightly in the amplitude direction by the amount of an increase in the inertia force, but it is not increased in a time-axis direction. For this reason, the time during which the friction engaging elements of the speed change mechanism are slipping while transmitting a torque is always held a constant speed change time. This can makes a contribution to an enhancement in the durability of the transmission. In addition, since there is no possibility that the output shaft torque will be increased in a time-axis direction, there is an advantage that a satisfactory feeling in speed changes is always obtained.

BRIEF DESCRIPTION OF THE DRAWINGS

The above and other objects and advantages of the present invention will become apparent from the following detailed description when read in conjunction with the accompanying drawings in which.

DETAILED DESCRIPTION OF THE PREFERRED EMBODIMENTS

Embodiments of the present invention will hereinafter be described in reference to the drawings.

First Embodiment

First, a speed change transition control apparatus according to a first embodiment of the present invention will be described.

Figure 1:
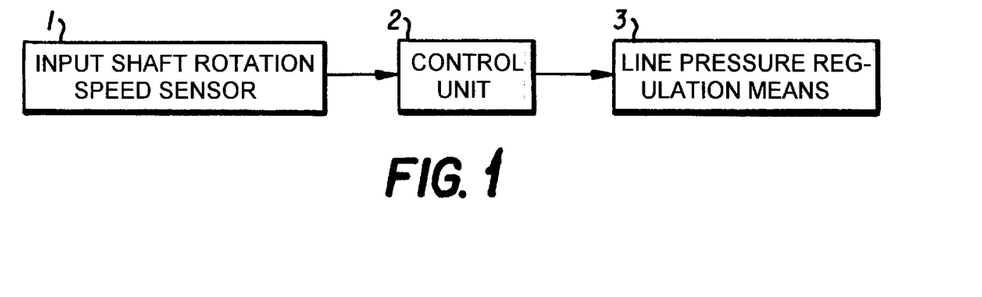
FIG. 1 is a block diagram showing a speed change transition control apparatus according to a first embodiment of the present invention.

The speed change transition control apparatus, as shown in FIG. 1, is constituted by an input shaft revolution sensor 1, a control unit 2, and a line pressure regulation means 3.

The input shaft revolution sensor 1 corresponds to the rotational speed detection means of the present invention, and is a sensor which detects the rotational speed of the input shaft of a speed change mechanism in an automatic transmission, specifically the rotational speed of a rotational shaft connected to the turbine runner of the torque converter.

The control unit 2 constitutes the arithmetic means, target rotation slope correction means, and feedback control means of the present invention. Specifically, the control unit 2 operates according to a previously set program and consists of a microcomputer equipped with memory in which various kinds of set values and learned values are stored.

Figure 3:
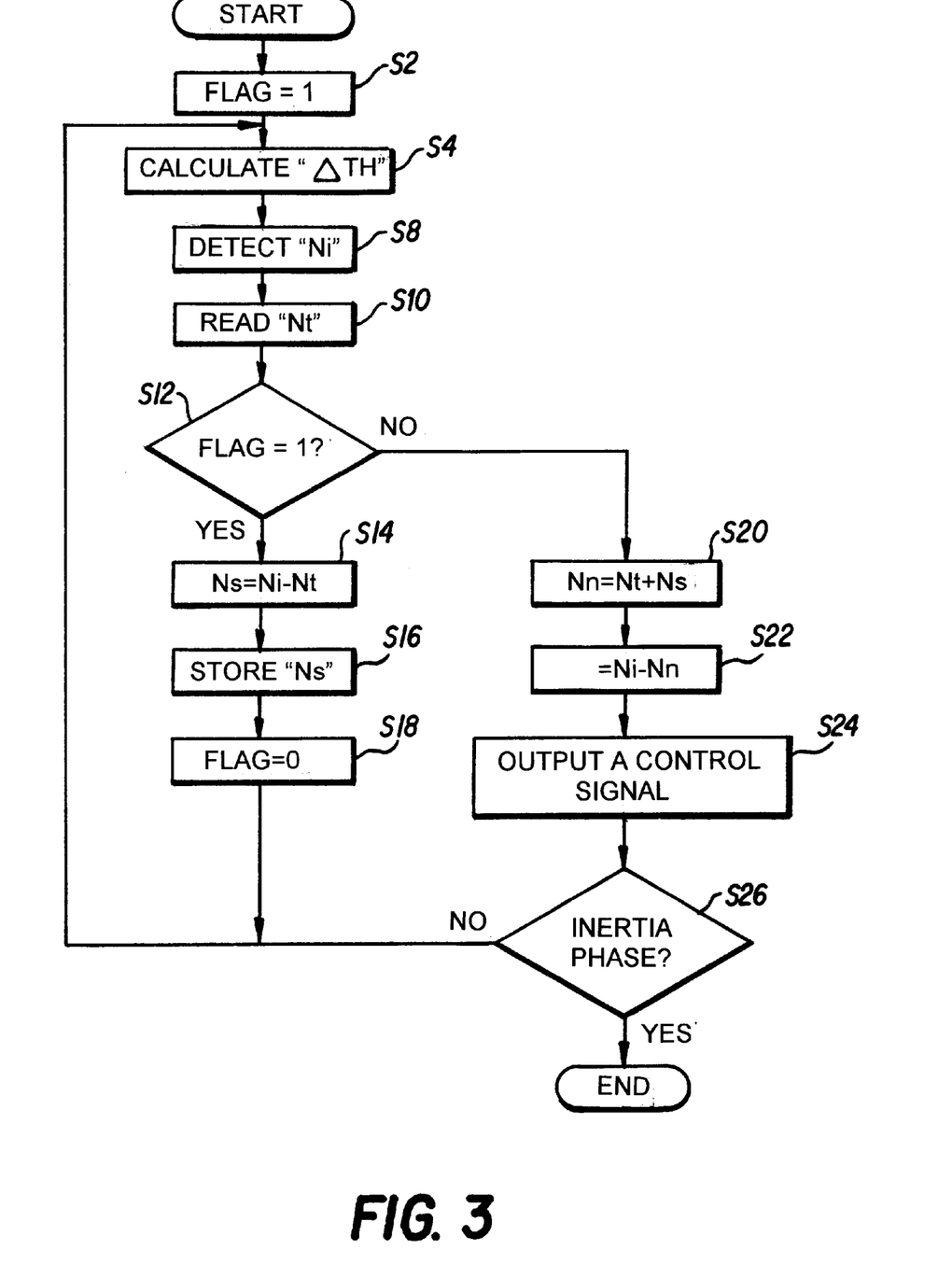
FIG. 3 is a flowchart showing the characteristic control process contents of the speed change transition control apparatus according to the first embodiment of the present invention.

In this case, the control unit 2 has a characteristic in that the oil pressure to the friction engaging element on the locking side is controlled in the inertia phase during speed changes, by the process shown in a flowchart of FIG. 3 to be described later.

The line pressure regulation means 3 corresponds to the fluid pressure control element of the present invention. Specifically, the line pressure regulation means 3 is pressure regulation means such as a duty solenoid valve incorporated in an oil pressure control circuit which is provided in the lower portion of a speed change mechanism casing. The line pressure regulation means 3 operates according to an oil pressure control signal from the control unit 2 and regulates the output line pressure of an oil pump (not shown), thereby regulating oil pressure which is supplied to the friction engaging element of the speed change mechanism.

Note that the oil pressure control for the friction engaging element on the release side during speed-changes and the oil pressure control on the locking side in the torque phase can also be performed in a conventional manner, for example, by the control unit 2. Since the first embodiment of the present invention is applied to the oil pressure on the locking side in the inertia phase, a description is not made of the process of the other oil pressure controls.

In addition, since the present invention is not limited to the constitution of the speed change mechanism and the constitution and operation of the main body of the speed change mechanism, a description thereof is not given.

Now, the oil pressure control process for the friction engaging element on the locking side in the inertial phase during speed changes by the control unit 2 will be described in reference to a flowchart of FIG. 3. This process is carried out with detection of the inertial phase during a speed change as the starting point.

The inertial phase detection used herein means detection of the start of the inertia phase which is the second stage of a speed change. The inertial phase detection is performed, for example, by the following principles. That is, in the case of shifting up, the rotational speed of the transmission input shaft detected by the input shaft revolution sensor 1 begins to decline drastically at the start point of the inertia phase. For this reason, at the time an inflection point in such a change in the rotational speed has been detected, it is judged that the inertia phase has started.

If the oil pressure control process is started by detection of the inertia phase, in step S2 the first flag indicating whether or not the control cycle is the first control cycle immediately after the start of the process will first be set to 1.

Then, in step S4 a throttle opening angle change quantity $\Delta$ TH during a speed change is computed on the basis of a detection value from a throttle opening angle sensor (not shown).

Next, in step S8 the measured value Ni of the rotational speed detected at that time by the input shaft revolution sensor 1 is read in. In step S10 the value of a target rotational speed Nt at that time is read from a first target rotation slope.

The target rotation slope, as shown in FIG. 2, is the target of the secular change characteristic of the input shaft rotation speed which changes linearly at a constant rate of change, and means a set of the target values of input shaft rotation speeds at points on the slope. The first target rotation slope in this case is an ideal secular change characteristic of an input shaft rotation speed. That is, the first target rotation slope, as shown in a graph of FIG. 2, is a line with an ideal input shaft rotation speed (at an inertia phase start point T0 previously set to realize ideal speed change timing) as the starting point and also with an input shaft rotation speed change rate (computed from a quantity of change between input shaft rotation speeds before and after a speed change and computed from speed change time) as the inclination.

Note that the first target rotation slope may be previously set for each condition such as a throttle opening angle and registered in the control unit 2. Also, the first target rotation slope may be computed in real time from ideal speed change timing (speed change starting time and speed change time) previously set for each condition such as a throttle opening angle.

In step S12 the value of the first flag is judged. If it is 1, the process will advance to step S14. If it is not 1, the process will advance to step S20.

In step S14 the difference (Ni−Nt) between the measured value Ni of the rotational speed and the target rotational speed Nt at that time is computed. In step S16 the computed value is registered in memory as the rotational speed difference Ns (constant value).

In step S18 the value of the first flag is updated to 0, and the process advances to step S26.

On the other hand, in step S20, from the target rotational speed Nt read in step S10 and the rotational speed difference Ns registered in step S16, a new target rotational speed Nn (Nn=Nt+Ns) which is the corrected value of the target rotational speed is computed. The target rotational speed Nn in this case constitutes the second target rotation slope of the present invention.

In step S22, from the measured value Ni of the rotational speed read in step S8 and the target rotational speed Nn computed in step S20, a deviation E (E=Ni−Nn) for feedback control is computed.

In step S24 an oil pressure control signal for causing the deviation E computed in step S22 to approach zero is output to the line pressure regulation means 3.

Finally, in step S26 it is judged whether or not the inertia phase has ended. If it has ended, the oil pressure control process will be ended. If it has not ended, the oil pressure control process will return to step S4, and step S4 and steps thereafter will be repeated a predetermined number of cycles. Note that the judgment of whether or not the inertia phase has ended is performed, for example, by the following principles. That is, in the case of shifting up, a reduction in an actual rotational speed Ni detected by the input shaft revolution sensor 1 is stopped at the time the inertial phase has ended. For this reason, at the time an inflection point in such a change in the rotational speed has been detected, it is judged that the inertia phase has ended.

In the above-mentioned oil pressure control process, with the branch process in step S12 and the update process of the first flag in step S18, steps S14 to S18 are executed only at the first cycle immediately after the start of the inertia phase, and the rotational speed difference Ns is set.

Thereafter, until the inertia phase ends, steps S8, S10, and S20 to S24 are repeated, and deviation E is computed in sequence from the measured value Ni of the rotational speed and the target rotational speed Nt newly read every time and from the aforementioned rotational speed Ns (a constant value in this embodiment). Based on the deviation E sequentially computed in this manner, an oil pressure control signal is output for each cycle.

Thus, real-time feedback control is realized with the actual rotational speed Ni as the feedback value and also with the corrected target rotational speed Nn (Nn=Nt+Ns) of the target rotational speed Nt as the control target value.

Therefore, according to the control apparatus of the first embodiment of the present invention, for example in the case of shifting up, as shown in FIG. 2(b), the actual rotational speed Ni is reduced smoothly with a less quantity of fluctuation, and a fluctuation in the output shaft torque is also suppressed.

That is, in the first embodiment of the present invention, the difference Ns between an input shaft rotation speed at an actual inertia phase start point on the first target rotation slope with an input shaft rotation speed at a previously set inertia phase start point T0 as the starting point, and an actual input shaft rotation speed detected at an actual inertial phase start point T1 is computed. Based on this rotational speed difference Ns, the first target rotation slope is moved in a parallel direction. With this parallel movement, a second target rotation slope with an actual input shaft rotation speed as the starting point is set as shown by a chain line in FIG. 2(b). And the engagement pressure of the friction engaging element is fed back through the line pressure regulation means 3 (fluid pressure control element) so that an actual input shaft rotation speed during a speed change follows the second target rotation slope.

Therefore, the actual rotation speed Ni and the control target value Nn are the same at the start point of the oil pressure control, and the control quantity proportional to the deviation E becomes nearly zero. For this reason, the control quantity for causing the actual rotational speed Ni to approach the control target value Nn is slowly developed. The actual rotational speed Ni, as shown in FIG. 2(b), is reduced more smoothly with less fluctuation than prior art, and consequently, a fluctuation in the output shaft torque Tp is also reduced.

Therefore, according to the first embodiment of the present invention, a speed change shock developed in the inertia phase during speed changes can be made less uncomfortable, whereby an enhancement in a feeling in speed changes can be achieved.

Second Embodiment

Now, a second embodiment of the present invention will be described. This embodiment has a characteristic in the control contents of the control unit 2 and the remaining constitution is similar to the first embodiment, so a description will be made only of the characteristic part of the control contents.

Figure 4:
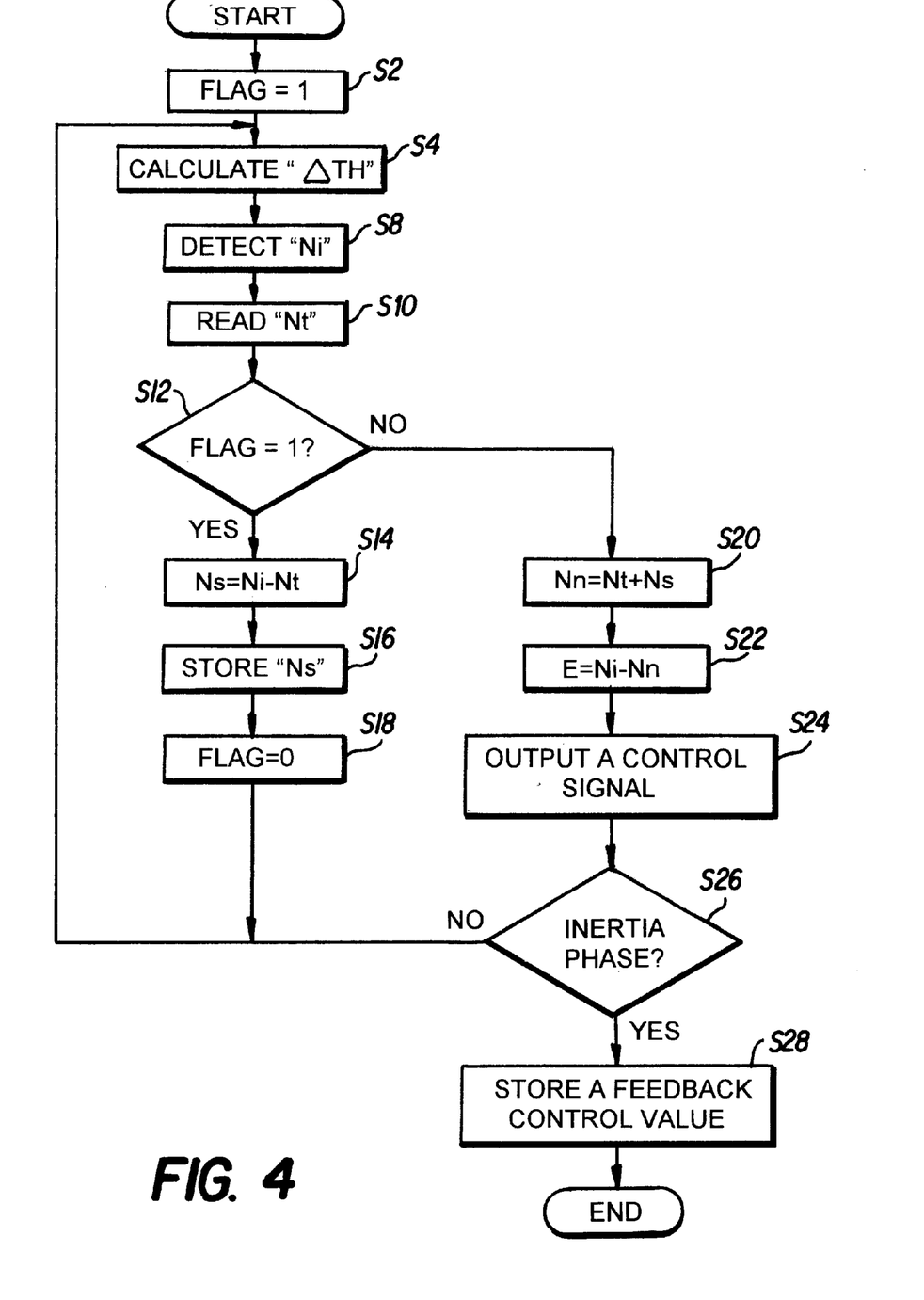
FIG. 4 is a flowchart for describing a second embodiment of the present invention.

The second embodiment, as shown in FIG. 4, is provided with step S28 of registering in memory the values detected or set in the oil pressure control during a speed change. These values have a learning function which is used in the next speed change of the same kind.

Specifically, a difference between an actual line pressure during a speed change regulated as a result of the aforementioned feedback control and an ideal line pressure, for example, is stored, and in the next speed change of the same kind, this pressure difference is added immediately after the start of the speed change to the control target value of line pressure.

If such a learning function is executed, an error in the oil pressure control will be corrected each time an identical speed change is repeated, so smoother and quicker speed changes will be realized.

Third Embodiment

Now, a third embodiment of the present invention will be described. The control unit 2 in this embodiment constitutes the target rotational speed setting means, target rotational speed correction means, and feedback control means of the present invention.

Figure 5:
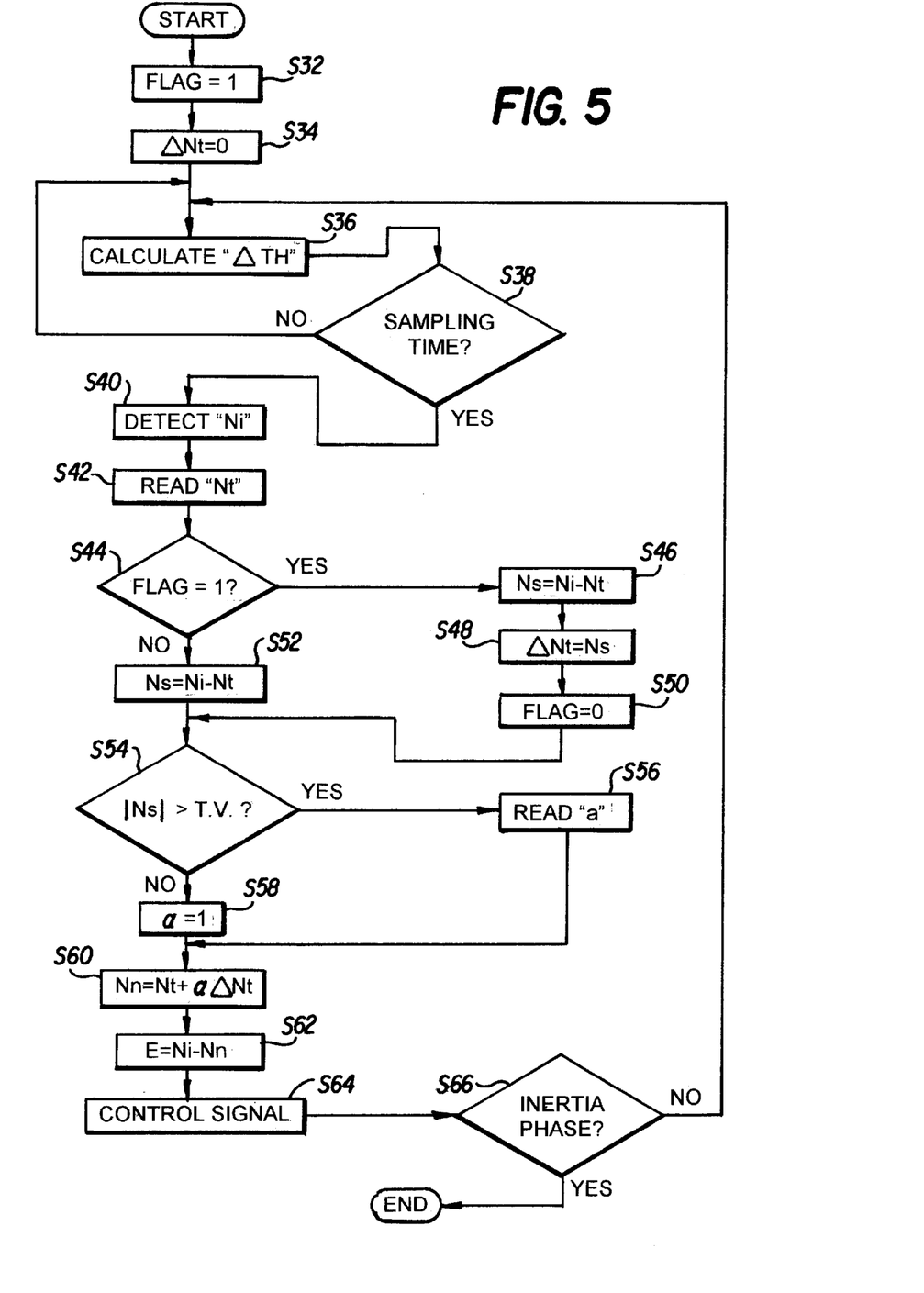
FIG. 5 is a flowchart for describing a third embodiment of the present invention.

The oil pressure control process by the control unit 2 in the second embodiment is performed according to a flowchart of FIG. 5.

That is, if the oil pressure control process is started by detection of the inertia phase, in step S32 the value of the first flag indicating whether or not the control cycle is the first control cycle immediately after the start of the process will first be set to 1.

Then, in step S34 the value of Δ Nt for computing a new target rotational speed, described later, is reset to 0.

In step S36 a throttle opening angle change quantity Δ TH during speed change time is computed.

In step S38 it is judged whether or not sample detection time has elapsed. If it has elapsed, the process will advance to step 40. If it has not elapsed, the process will return to step S36. Note that the sample detection time is microscopic time that determines the period of the control cycle which is repeated a plurality of times (i.e., 25 times) during a speed change.

In step S40 the measured value Ni of the rotational speed detected at that time by the input shaft revolution sensor 1 is read in. Then, in step S42 the value of a target rotational speed Nt at that time is read in. Note that the target rotational speed Nt in this case corresponds to the first target value of the input shaft rotation speed of the present invention.

The target rotational speed Nt is an input shaft rotation speed which is determined by the aforementioned first target rotation slope, and particularly at control start point T1, there is a large difference between the target rotational speed Nt and an actual input rotational speed Ni, as in the case shown in FIG. 2.

In step S44 the value of the first flag is judged. If it is 1, the process will advance to step S46. If it is not 1, the process will advance to step S52.

In step S46 the difference Ns (Ns=Ni−Nt) between the measured value Ni of the rotational speed and target rotational speed Nt at that time is computed. In step S48 the computed rotational speed difference Ns is registered as Δ Nt. Note that the rotational speed difference Ns in this case is not a constant value like the first embodiment. In step S46, or in step S52 to be described later, the rotational speed difference Ns is computed for each control cycle, and the computed rotational speed differences Ns are different values, respectively. However, the value of Δ Nt is the value of Ns computed in step S46 at the first control cycle and is constant during a speed change.

In step S50 the value of the first flag is updated to 0, and the process advances to step S54.

On the other hand, in step 54, as with step S46, the difference Ns (Ns=Ni−Nt) between the measured value Ni of the rotational speed and target rotational speed Nt at that time is computed.

In step S54 the absolute value of the rotational speed Ns is compared with a previously set threshold value. If the absolute value of the rotational speed Ns has exceeded the threshold value, the process will advance to step S56. If it has not exceeded, the process will advance to step S58.

In step S56 the value of a correction value $\alpha$, previously set according to the value of the rotational speed difference Ns, is read in. Note that if rotational speed difference Ns>0, the value of a is set to a value greater than 1, and if rotational speed difference Ns<0, the value of $\alpha$ is set to a value less than 1.

On the other hand, in step S58 the correction value a is set to 1, and the process advances to step S60.

In step S60, from the target rotational speed Nt read in step S42, the value of $\Delta$ Nt set in step S48, and the correction value $\alpha$ set in step S56 or S58, a new target rotational speed Nn (Nn=Nt+$\alpha$Nt) which is the second target value of the input shaft rotation speed is computed.

Note that the threshold value in step S54 and the correction value $\alpha$ read in step S56 may be previously set to an optimum value obtained by experiment, for example. Also, these values may be set to different values for each control cycle.

In step S62, from the measured value Ni of the rotational speed read in step S40 and the new target rotational speed Nn computed in step S60, a deviation E (E=Ni−Nn) for feedback control is computed.

Thereafter, in step S64, an oil pressure control signal for causing the deviation E computed in step S62 to approach zero is output to the line pressure regulation means 3.

Finally, in step S66 it is judged whether or not the inertia phase has ended. If it has ended, the control process will be ended. If it has not ended, the control process will return to step S36, and step S36 and steps thereafter will be repeated a predetermined number of cycles.

In the aforementioned control process, with the branch process in step S44 and the update process of the first flag in step S50, steps S46 to S48 are executed only at the first cycle immediately after the start of the inertia phase, and the rotational speed difference Ns immediately after the start of the inertial phase is set as $\Delta$ Nt.

Thereafter, each time a predetermined control cycle is repeated, the rotational speed difference Ns at each control cycle is computed in step S52 every time, and the computed rotational speed difference Ns is compared with the threshold value.

When the rotational speed difference Ns exceeds the threshold value, in step S56 the value of $\alpha$, previously set according to the rotational speed difference Ns, is read in. When the rotational speed difference Ns is less than the threshold value, in step S58 the value of $\alpha$ is set to 1 and a new target rotational speed Nn (Nt+$\alpha$Nt) is computed every time (step S60). With this new target rotational speed Nn as a control target value, a feedback control for line pressure is performed.

Since the new target rotational speed Nn (the second target value of the input shaft rotation speed) is obtained by adding the value of $\alpha\Delta$ Nt to the set target rotational speed Nt (the first target value of the input shaft rotation speed), the new target rotational speed Nn becomes a value closer to an actual rotational speed Ni (Ni=Nt+Ns) in correspondence to the value of the rotational speed difference Ns.

That is, according to the third embodiment of the present invention, in each control cycle including the control start point, the difference between a target rotational speed (first target value) and an actual rotational speed is judged. In correspondence to this rotational speed difference, a new target rotational speed (second target value) closer to the actual rotational speed is set. Based on this new rotational speed, a feedback control for line pressure is performed.

Thus, the control quantity proportional to the deviation E is not excessively increased with reliability after the start of the control as well as at the start of the control. The actual rotational speed Ni is reduced smoothly with less fluctuation than prior art, and consequently, a fluctuation in the output torque Tp is considerably reduced.

Fourth Embodiment

Now, a speed change transition control apparatus according to a fourth embodiment of the present invention will be described.

Figure 6:
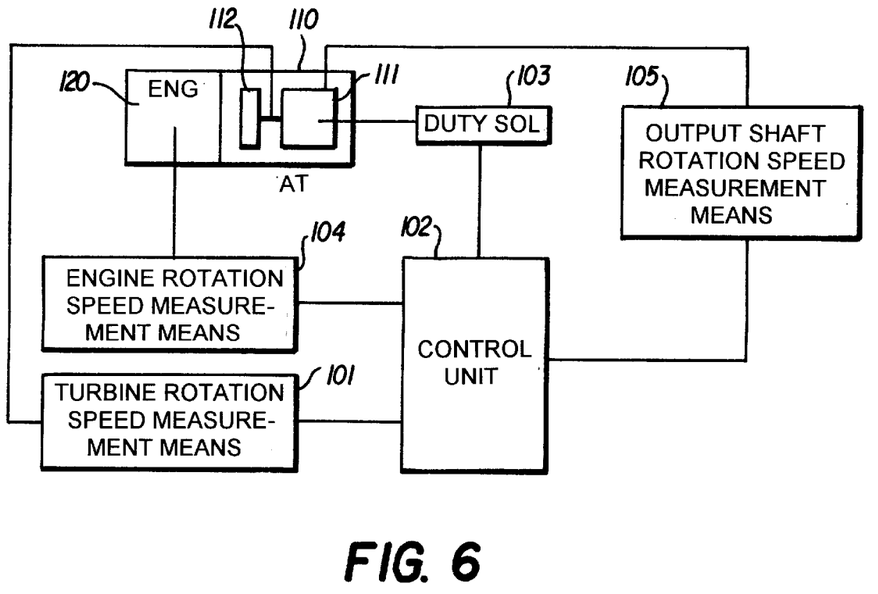
FIG. 6 is a block diagram showing a speed change transition control apparatus according to a fourth embodiment of the present invention.

The speed change transition control apparatus, as shown in FIG. 6, is constituted by turbine rotation speed measurement means 101, a control unit 102, a duty solenoid valve 103, engine rotation speed measurement means 104, and output shaft rotation speed measurement means 105.

The turbine rotation speed measurement means 101, engine rotation speed measurement means 104, and output shaft rotation speed measurement means 105 correspond to the rotation speed detection means of the present invention.

The turbine rotation speed measurement means 101 is a sensor which detects the rotational speed of the input shaft of a speed change mechanism 111 in an automatic transmission 110. In this case, the turbine rotation speed measurement means 101 detects the rotational speed Nt of a rotational shaft connected to the turbine runner of a torque converter 112. The engine rotation speed measurement means 104 is a means of detecting the rotational speed of the output shaft of the engine 120 of a vehicle. In other words, the engine rotation speed measurement means 104 is a means of detecting the rotational speed of the input shaft of the automatic transmission 110 (in the case, the means 104 detects the rotational speed of a pump impeller of the torque converter 112). The output shaft rotation speed measurement means 105 is a means of detecting the rotational speed of the output shaft of the speed change mechanism 111 in the automatic transmission 110.

The control unit 102 constitutes the target change rate setting means and feedback control means of the present invention. Specifically, the control unit 102 operates according to a previously set program and consists of a microcomputer equipped with memory in which various kinds of set values are stored.

Figure 7:
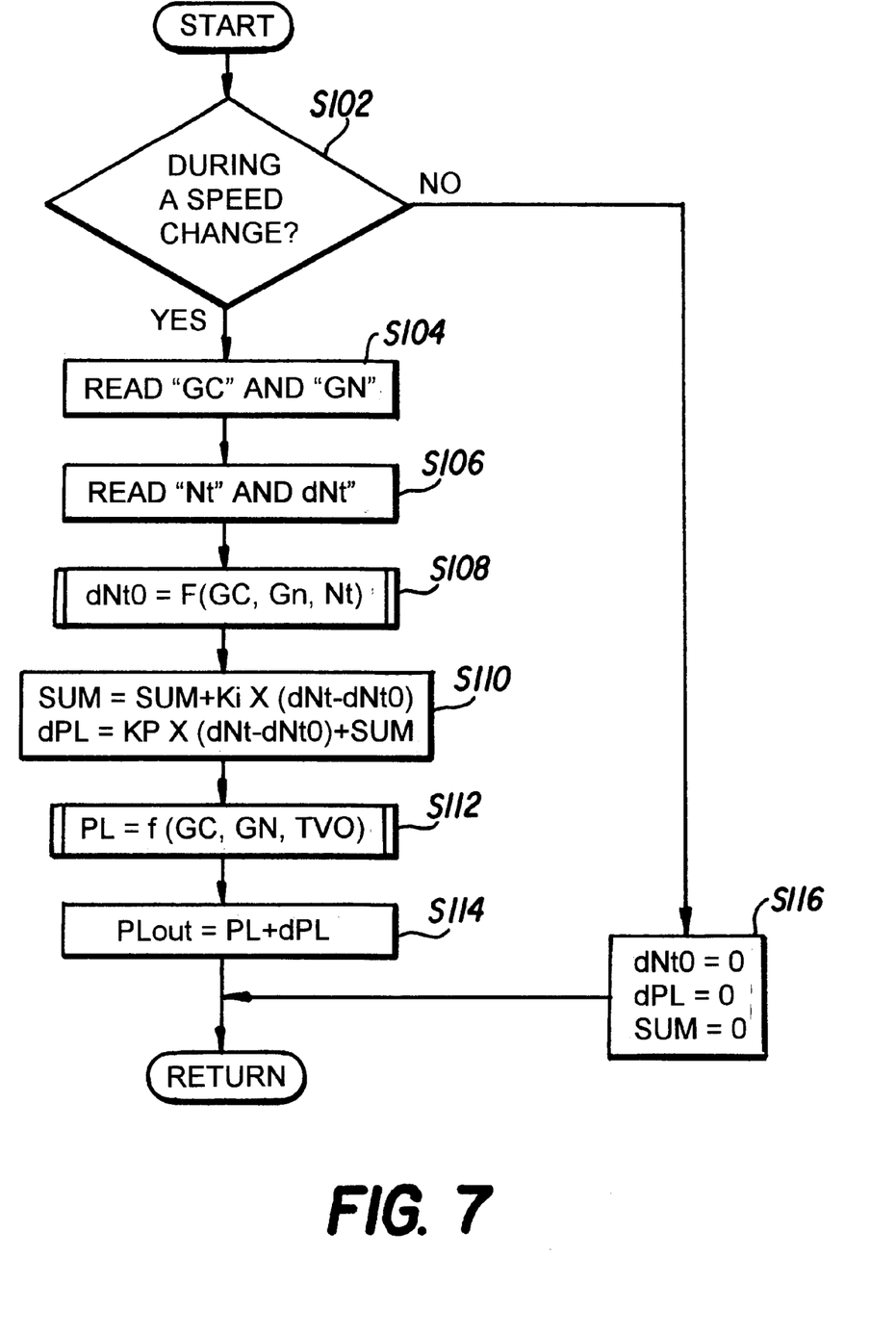
FIG. 7 is a flowchart showing the characteristic control process contents of the speed change transition control apparatus according to the fourth embodiment of the present invention.

In this case, the control unit 102 has a characteristic in that the oil pressure of the friction engaging element on the locking side is controlled in the inertia phase during speed changes, by the process shown in a flowchart of FIG. 7 to be described later.

The duty solenoid valve 103 corresponds to the fluid pressure control element of the present invention. The duty solenoid valve 103 is pressure regulation means incorporated in an oil pressure control circuit which is provided in the lower portion of a speed change mechanism casing. The duty solenoid valve 103 operates according to an oil pressure control signal from the control unit 102 and regulates the output line pressure of an oil pump (not shown), thereby regulating oil pressure which is supplied to the friction engaging element of the speed change mechanism.

Note that the oil pressure control for the friction engaging element on the release side during speed changes and the oil pressure control on the locking side in the torque phase can also be performed in a conventional manner, for example, by the control unit 102. Since the fourth embodiment of the present invention has a characteristic in the control of the oil pressure on the locking side in the inertia phase, a description is not made of the process of the other oil pressure controls.

In addition, since the present invention is not limited to the constitution of the speed change mechanism 111 and the constitution and operation of the transmission 110, a description thereof is not given.

Now, the oil pressure control process for the friction engaging element on the locking side in the inertial phase during speed changes by the control unit 102 will be described in reference to a flowchart of FIG. 7. Note that the following sequence of steps is repeated and executed a predetermined number of cycles as part (subroutine) of the process which is executed by the control unit 102.

First, in step S102 it is judged whether or not the inertia phase during a speed change has been detected. If it has been detected, the process will advance to step S104. If it has not been detected, the process will advance to step S116. In step S116 the values of $dNt_0$, $dPL$, and $S_{um}$ to be described later are reset to 0.

The inertial phase detection used herein means detection of the start of the inertia phase which is the second stage of a speed change. The inertial phase detection is performed, for example, by the following principles. That is, in the case of shifting up, the rotational speed of the transmission input shaft detected by the turbine rotation speed measurement means 101 begins to decline drastically at the start point of the inertia phase. For this reason, at the time an inflection point in such a change in the rotational speed has been detected, it is judged that the inertia phase has started.

Then, in step S104, in response to an speed change instruction based on a set speed change diagram, the present gear ratio GC and the gear ratio GN after a speed change are read in.

In step S106 the actual input shaft rotation speed Nt of the speed change mechanism 111 detected at that time by the turbine rotation speed measurement means 101 is read in, and a change rate dNt in the input shaft rotation speed Nt obtained at that time is also read in. Note that the computation of the measured value of the input shaft rotation speed Nt is performed, for example, at cycles of 10 msec by another process. Based on the difference between the previous value and the current value, the change rate dNt (change quantity per unit time) is computed.

In step S108, from the values GC, GN, and Nt read in step S104 or S106, the target change rate $dNt_0$ in the input shaft rotation speed for causing a speed change to end within speed change time T up to a predetermined speed change end point is computed, for example, by the following equation (1):

$$dNt_0=(1-GN/GC)\cdot Nt/T \quad (1)$$

In step S110, based on the deviation between the target change rate $dNt_0$ and the actual change rate Nt read in step S6, the feedback control quantity dPL of oil pressure is computed by a proportional-plus-integral method. Specifically, from previously set constants Ki and KP the feedback control quantity dPL is computed, for example, by the following equations (2) and (3):

$$S_{um}=S_{um}+Ki\times(dNt-dNt_0) \quad (2)$$

$$dPL=KP\times(dNt-dNt_0)+S_{um} \quad (3)$$

In step S112, from the input torque $T_{vo}$ judged from the intake air pressure of the engine and the opening angle of the throttle valve, and also from the gear ratio values GC and GN read in step S104, oil pressure PL required during a speed change is computed by a known function.

In step S114 the feedback control quantity dPL computed in step S110 is added to the required oil pressure PL computed in step S112, whereby a final control quantity $PL_{out}$ for oil pressure control is computed. An oil pressure control signal corresponding to this value is output to the duty solenoid valve 103.

In the above-mentioned oil pressure control process, with steps S104 to S108, the target change rate $dNt_0$ in the input shaft rotation speed Nt for ending a speed change until a predetermined speed change end point is computed on the basis of the measured value of the input shaft rotation speed Nt during a speed change. With this target change rate $dNt_0$ as a control target, the feedback control for oil pressure during a speed change is performed. As evident in the above-mentioned equation (1), if the actual input shaft rotation speed Nt in this case becomes high, the absolute value of the target change rate $dNt_0$ will be set to a greater value in correspondence to the value of the input shaft rotation speed Nt.

For this reason, for example in the case where the actual input shaft rotation speed Nt fluctuates at inertia phase start point $X_0$ in an increasing direction, the absolute value of the target change rate $dNt_0$ is set to a greater value in correspondence to the degree of fluctuation. Therefore, the oil pressure P is adjusted to a greater value, as shown by a chain line in FIG. 5. Since the input shaft rotation speed Nt changes at a sharper slope, the speed change ends within a predetermined speed change time $T_0$. At this time, the output shaft torque $T_p$ is increased slightly in the amplitude direction by the amount of an increase in the inertia force, but it is not increased in the time-axis direction.

Therefore, the time during which the friction engaging elements of the speed change mechanism 111 are slipping while transmitting a torque remains a constant speed change time $T_0$ at all times. This can make a contribution to an enhancement in the durability of the transmission. In addition, since there is no possibility that the output shaft torque Tp will be increased in the time-axis direction, there is an advantage that a satisfactory feeling in speed changes is always obtained.

Fifth Embodiment

Now, a fifth embodiment of the present invention will be described. This embodiment has a characteristic in the control contents of the control unit 102 and the remaining constitution is similar to the fourth embodiment of the present invention, so a description will be made only of the characteristic part of the control contents.

Figure 8:
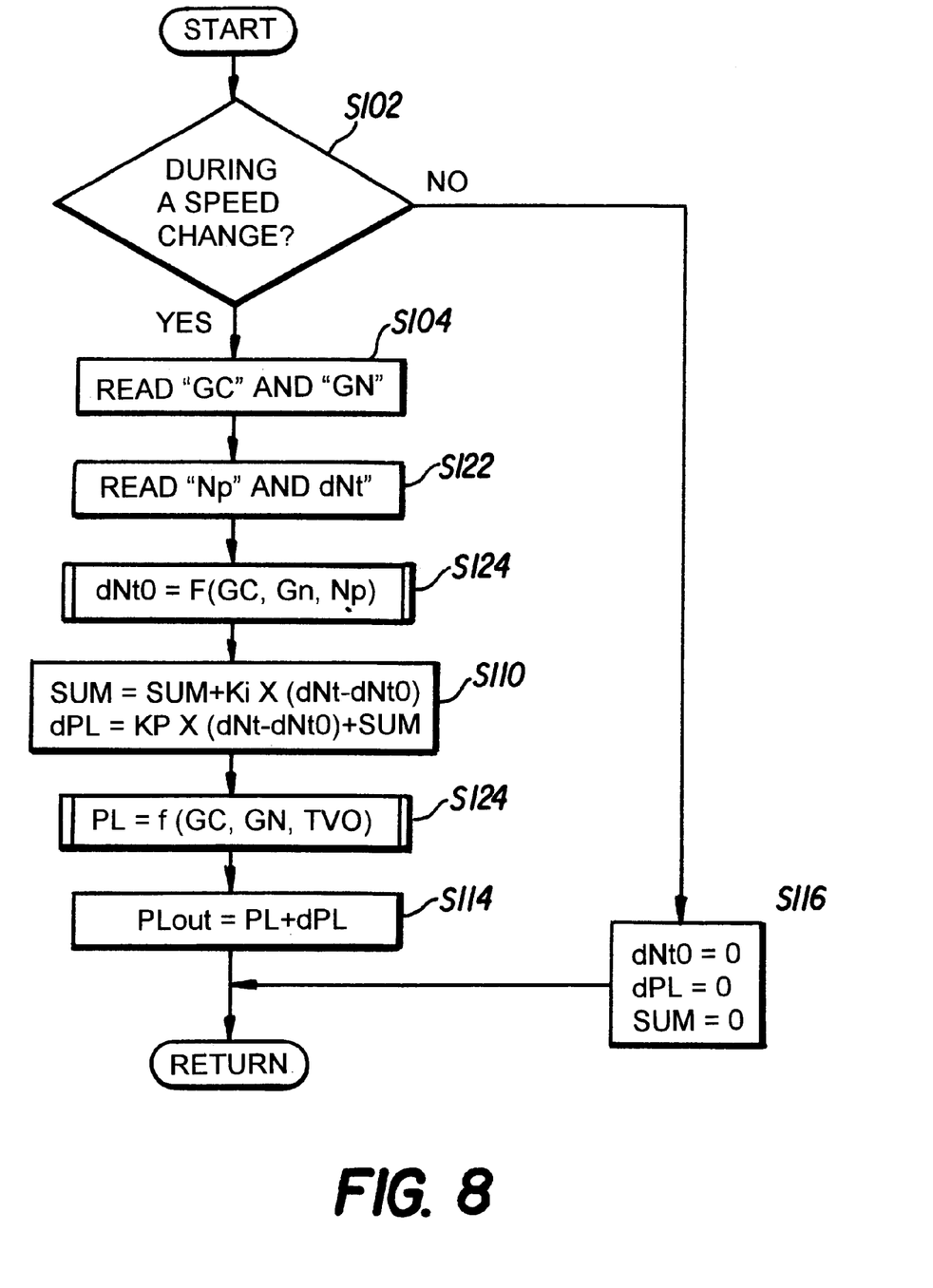
FIG. 8 is a flowchart for describing a fifth embodiment of the present invention.

The fifth embodiment, as shown in FIG. 8, is characterized in that in steps S122 and S124 corresponding to steps S106 and S108 of the fourth embodiment, output shaft rotation speed Np is used instead of the input shaft rotation speed Nt.

That is, in step S122, the actual output shaft rotation speed Np of the speed change mechanism 111 detected at that time by the output shaft rotation speed measurement means 5, and the change rate dNt in the input shaft rotation speed Nt obtained at that time are read in.

In step S124, from the values GC, GN, and Nt the target change rate $dNt_0$ in the input shaft rotation speed Nt for causing a speed change to end within speed change time T up to a predetermined speed change end point is computed, for example, by the following equation (4):

$$dNt_0 = (GC - GN) \cdot Np/T \quad (4)$$

In the above-mentioned oil pressure control process of FIG. 8, with steps S104, S122, and S124, the target change rate $dNt_0$ in the input shaft rotation speed Nt for ending a speed change until a predetermined speed change end point is computed on the basis of the measured value of the output shaft rotation speed Np during a speed change. With this target change rate $dNt_0$ as a control target, the feedback control for oil pressure during a speed change is performed. As evident in the above-mentioned equation (4), if the actual output shaft rotation speed Np in this case becomes high, the absolute value of the target change rate $dNt_0$ will be set to a greater value in correspondence to the value of the output shaft rotation speed Np. The output shaft rotation speed Np is proportional to the input shaft rotation speed Nt in correspondence to a gear ratio.

For this reason, for example in the case where the actual input shaft rotation speed Nt fluctuates at inertia phase start point $X_0$ in an increasing direction, the output shaft rotation speed Np also fluctuates in an increasing direction in correspondence to the fluctuation in the actual input shaft rotation speed Nt, so that the absolute value of the target change rate $dNt_0$ is set to a greater value in correspondence to the degree of fluctuation. Therefore, even in the fifth embodiment, as with the fourth embodiment, the speed change time remains a predetermined value $T_0$ and there is an advantage of an enhancement in the durability of the transmission.

Sixth Embodiment

Figure 9:
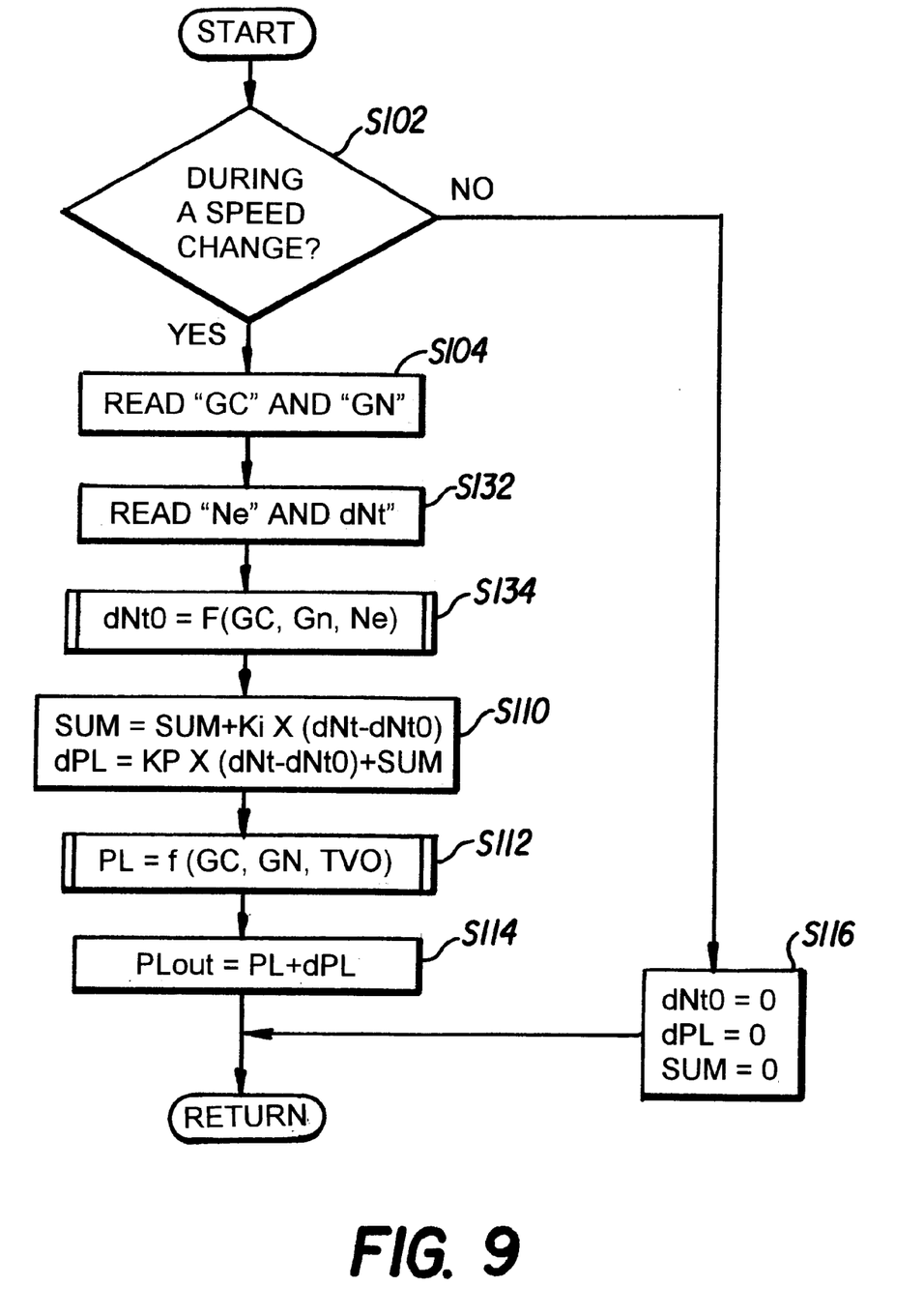
FIG. 9 is a flowchart for describing a sixth embodiment of the present invention.
Figure 10:
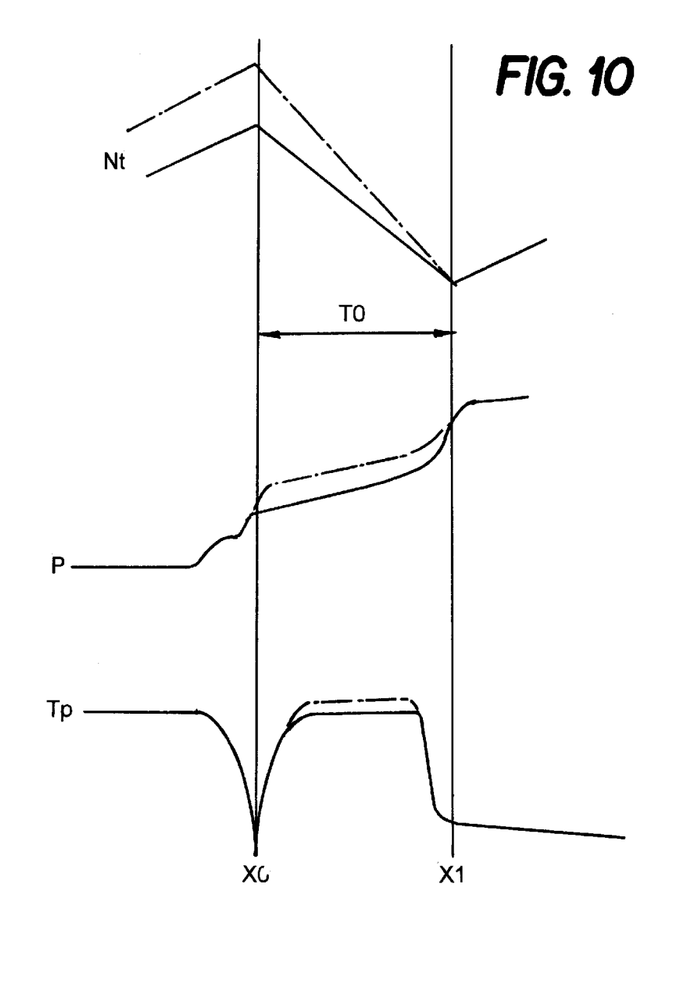
FIG. 10 is a diagram for describing the operation of the present invention.

Now, a sixth embodiment of the present invention will be described. The sixth embodiment, as shown in FIG. 9, is characterized in that in steps S132 and S134 corresponding to steps S106 and S108 of the fourth embodiment, engine rotation speed Ne (input shaft rotation speed of the transmission 10) is used instead of the input shaft rotation speed Nt.

That is, in step S132, the actual engine rotation speed Ne detected at that time by the engine rotation speed measurement means 4, and the change rate dNt in the input shaft rotation speed Nt obtained at that time are read in.

In step S134, from the values GC, GN, and Ne the target change rate $dNt_0$ in the input shaft rotation speed Nt for causing a speed change to end within speed change time T up to a predetermined speed change end point is computed, for example, by the following equation (5):

$$dNt_0 = (1 - GN/GC) \cdot (Ne - \alpha)/T \quad (5)$$

where $\alpha$ is the slippage quantity of the torque converter 112.

In the above-mentioned oil pressure control process of FIG. 9, with steps S104, S132, and S134, the target change rate $dNt_0$ in the input shaft rotation speed Nt for ending a speed change until a predetermined speed change end point is computed on the basis of the measured value of the engine rotation speed Ne during a speed change. With this target change rate $dNt_0$ as a control target, the feedback control for oil pressure during a speed change is performed. As evident in the above-mentioned equation (5), if the actual engine rotation speed Ne in this case becomes high, the absolute value of the target change rate $dNt_0$ will be set to a greater value in correspondence to the value of the engine rotation speed Ne. The engine rotation speed Ne and the input shaft rotation speed Nt are in a predetermined relation of $Nt = Ne - \alpha$.

For this reason, for example in the case where the actual input shaft rotation speed Nt fluctuates at inertia phase start point $X_0$ in an increasing direction, the engine rotation speed Ne also fluctuates in an increasing direction in correspondence to the degree of fluctuation in the input shaft rotation speed Nt, so that the absolute value of the target change rate $dNt_0$ is set to a greater value in correspondence to the degree of fluctuation. Therefore, even in the sixth embodiment, as with the fourth embodiment, the speed change time remains a predetermined value $T_0$ and there is an advantage of an enhancement in the durability of the transmission.

While the invention has been described with reference to specific embodiments thereof, various variations and modifications are possible. For example, in the above-mentioned embodiments, even at points after the inertia phase start point $X_0$, the value of the target change rate $dNt_0$ is updated and set based on an actual rotational speed of the transmission at that time, each time the process shown in FIGS. 7 to 9 is executed. However, a step of updating and setting the target change rate $dNt_0$ (i.e., step S108 in FIG. 7) may be performed only at the first control cycle immediately after detection of the inertia phase.

What is claimed is:

1. A speed change transition control apparatus for an automatic transmission which has a speed change mechanism for performing speed changes by locking or releasing a plurality of friction engaging elements and also which is equipped with a fluid pressure control element for controlling engagement pressure which is supplied to said plurality of friction engaging elements, the speed change transition control apparatus comprising:

rotational speed detection means for detecting an input shaft rotation speed of said speed change mechanism;

arithmetic means for computing a difference between an input shaft rotation speed at an actual inertia phase start point on a first target rotation slope with an input shaft rotation speed at a previously set inertia phase start point as the starting point and an actual input shaft rotation speed detected at an actual inertia phase start point by said rotational speed detection means;

target rotation slope correction means for setting a second target rotation slope having said actual input shaft rotation speed as its starting point by moving said first target rotation slope in a parallel direction in correspondence to the input shaft rotation speed difference computed by said arithmetic means; and feedback control means for controlling said engagement pressure through said fluid pressure control element in such a manner that said input shaft rotation speed during a speed change follows said second target rotation slope set by said target rotation slope correction means.

2. A speed change transition control apparatus for an automatic transmission which has a speed change mechanism for performing speed changes by locking or releasing a plurality of friction engaging elements and also which is equipped with a fluid pressure control element for controlling engagement pressure which is supplied to said plurality of friction engaging elements, the speed change transition control apparatus comprising:

rotational speed detection means for detecting an actual input shaft rotation speed of said speed change mechanism;

target rotational speed setting means for setting a first target value of said input shaft rotation speed for each control cycle during a speed change on the basis of a quantity of change between the input rotational speeds before and after the speed change and a previously set speed change timing;

target rotational speed correction means for computing a difference between said first target value set by said target rotational speed setting means and said actual rotational speed detected by said rotational speed detection means and then setting a second target value of said input shaft rotation speed by adding a value corresponding to said difference to said first target value, for each control circle during a speed change; and feedback control means for controlling said engagement pressure through said fluid pressure control element in such a manner that said input shaft rotation speed during a speed change follows said second target rotation slope set by said target rotation slope correction means.

3. A speed change transition control apparatus for an automatic transmission which has a speed change mechanism for performing speed changes by locking or releasing a plurality of friction engaging elements and also which is equipped with a fluid pressure control element for controlling engagement pressure which is supplied to said plurality of friction engaging elements, the speed change transition control apparatus comprising:

rotational speed detection means for detecting an actual rotational speed of said automatic transmission;

target change rate setting means for setting a target change rate in an input shaft rotation speed of said speed change mechanism on the basis of the actual rotational speed detected during a speed change by said rotational speed detection means so that the speed change is ended within a previously set speed change time; and feedback control means for controlling said engagement pressure through said fluid pressure control element in such a manner that said input shaft rotation speed during the speed change changes at said target change rate set by target change rate setting means.

4. The speed change transition control apparatus as set forth in claim 3, wherein said target change rate setting means sets an absolute value of said target change rate to a greater value, if said actual rotational speed is high.

5. The speed change transition control apparatus as set forth in claim 3, wherein the rotational speed detected by said rotational speed detection means is a rotational speed of an input shaft of said speed change mechanism.

6. The speed change transition control apparatus as set forth in claim 4, wherein the rotational speed detected by said rotational speed detection means is a rotational speed of an input shaft of said speed change mechanism.

7. The speed change transition control apparatus as set forth in claim 3, wherein the rotational speed detected by said rotational speed detection means is a rotational speed of an output shaft of said speed change mechanism.

8. The speed change transition control apparatus as set forth in claim 4, wherein the rotational speed detected by said rotational speed detection means is a rotational speed of an output shaft of said speed change mechanism.

9. The speed change transition control apparatus as set forth in claim 3, wherein the rotational speed detected by said rotational speed detection means is a rotational speed of an input shaft of said automatic transmission.

10. The speed change transition control apparatus as set forth in claim 4, wherein the rotational speed detected by said rotational speed detection means is a rotational speed of an input shaft of said automatic transmission.

* * * * *